(12) United States Patent
Smith et al.

(10) Patent No.: US 10,978,861 B2
(45) Date of Patent: Apr. 13, 2021

(54) LOCKING CABLE HANGER AND METHOD OF USING

(71) Applicant: CAMBRIA COUNTY ASSOCIATION FOR THE BLIND AND HANDICAPPED, Johnstown, PA (US)

(72) Inventors: Allen Garrett Smith, Johnstown, PA (US); Frank Edward Hodge, Portage, PA (US); David James Prasko, Hastings, PA (US); Timothy Joseph Wedding, Johnstown, PA (US)

(73) Assignee: CAMBRIA COUNTY ASSOCIATION FOR THE BLIND AND HANDICAPPED, Johnstown, PA (US)

( * ) Notice: Subject to any disclaimer, the term of this patent is extended or adjusted under 35 U.S.C. 154(b) by 440 days.

(21) Appl. No.: 15/662,474

(22) Filed: Jul. 28, 2017

(65) Prior Publication Data

US 2017/0338638 A1 Nov. 23, 2017

Related U.S. Application Data

(63) Continuation of application No. 14/556,117, filed on Nov. 29, 2014, now Pat. No. 9,722,405.

(51) Int. Cl.
*F16L 3/00* (2006.01)
*H02G 3/30* (2006.01)
(52) U.S. Cl.
CPC ..................................... *H02G 3/30* (2013.01)
(58) Field of Classification Search
CPC .......... H02G 3/32; H02G 3/30; H02G 3/0608;
H02G 3/26; H02G 3/0456; F16L 3/24;
F16L 3/223; F16L 3/237; F16L 3/2235;
F16L 3/222; F16L 3/04; F16L 3/221
USPC ......... 248/49, 58, 61, 62, 65, 68.1, 73, 74.1, 248/302, 303
See application file for complete search history.

(56) References Cited

U.S. PATENT DOCUMENTS

| 499,549 A | 6/1893 | Hunter et al. | |
|---|---|---|---|
| 1,609,052 A * | 11/1926 | Blackburn | H02G 7/10 248/61 |
| 1,720,746 A | 7/1929 | Povlsen et al. | |
| 1,912,704 A | 6/1933 | Graham | |
| 2,106,006 A * | 1/1938 | Klein | H02G 7/10 248/61 |
| 2,172,174 A * | 9/1939 | Pierson | H02G 7/10 248/61 |
| 2,210,722 A * | 8/1940 | Klein | H02G 7/10 174/154 |
| 2,384,440 A * | 9/1945 | Carr | H02G 7/10 248/61 |
| 2011/0079427 A1 | 4/2011 | Powale et al. | |
| 2011/0089294 A1 | 4/2011 | Buytaert et al. | |

* cited by examiner

*Primary Examiner* — Steven M Marsh
(74) *Attorney, Agent, or Firm* — Eckert Seamans Cherin & Mellott, LLC (57) ABSTRACT

A locking cable hanger assembly for the solar, mining, and electrical industry includes a new wire locking mechanism, new multiple cable carrier saddles on one hanger, data carrier wire capability, and optional high dielectric, UV coated material.

17 Claims, 12 Drawing Sheets

LOCKING CABLE HANGER AND METHOD OF USING

CROSS REFERENCE TO RELATED APPLICATION

This application is a continuation application of and claims priority to U.S. patent application Ser. No. 14/556,117, filed Nov. 29, 2014.

BACKGROUND OF THE INVENTION

This invention has to do with a locking cable hanger system for use in the solar, mining, and electrical industries. In solar, mining, and electrical industries there is a need for electrical cables to extend from a power or signal source to a location of application. Such cables are usually supported by a messenger wire that are themselves independently structurally supported and strung along the planned cable route. In solar plants, direct current wires attach first to the solar panels and then run to combiner boxes before extending further to power inverters. In addition, alternating current power cables are used to power the motors that control the trackers, devices that rotate the solar panels to follow the sun in order to obtain maximum power during daylight hours.

Prior to 2014, AC and DC cables could be bundled immediately adjacent to, and touching, one another in a wire management system for the solar panels. In the new National Electric Code of 2014, the AC and DC cables must not be immediately adjacent to one another, but must have a degree of separation from one another. Power carrying cables have a tendency to induce errors or interfere with the signal wires that are located in close proximity to them. This new requirement also applies to other applications outside the solar power industry, such as the mining and electrical industries.

Because of the increased use of trackers in solar power plants, there is increased use of category five cables and other data wiring. This type of control wiring is used to give power plant operators feedback from the solar power plant array on what angles the panels are stationed, and what the proper angle should be to maximize power output from the sun. This data and information is constantly monitored to obtain maximum power output from the thousands of solar panels in the solar power plant. The type of wiring used in collecting data is sensitive to cables used for AC and DC power and because of that sensitivity, data wiring cannot be bundled with power cables and must be supported by a separate carrier that is at least one inch away from all power cables.

In solar power plants, mining and other electrical applications, there are various sized wires and bundles of wires with an almost unlimited variety of wire bundle sizes. Bundle size is becoming very important in the manufacture of hangers to accommodate these various sizes, especially in multiple carrier hangers.

The cable hanger has a unique locking arm attachment section which has a closed loop spiral for a secure lock on the messenger wire. In the past, hangers had open loops or modified open loops on the top attachment section which could easily fall off if the hanger were bumped or hit during the wire loading process. In a solar plant there is a recent move to tracker systems which utilize more wiring than previously fixed in place systems. There is also the new NEC code which went into effect Jan. 1, 2014, which states that all AC and DC wiring must now be separated in any hanging or support system. Because of these changes, the wire management systems are much more complex, especially given the vast number of wires involved in a utility scale solar power plant. With these changes, the hangers are initially installed on the messenger wire with a captive top spiral loop, and the bundles of cables are loaded separately in the carrier or carriers of the hanger. This process continues until all individual cables and bundles of cables are supported in the hangers. In the process of loading cables, the hangers are constantly bumped and jostled as they are loaded with bundles of cables. All styles of hangers presently on the market can easily fall off the messenger wire because they are only hanging by one open loop, and they can fall off when bumped during cable installation. Cambria County's Association for The Blind And Handicapped ("CAB") is a new and improved captive locking arm designed to securely grip the messenger wire so the cable hangers stay in position during the entire loading process and will not fall off when bumped or knocked. After all cables are loaded, the other top attachment end of the cable hanger is then squeezed and locked on the messenger wire.

The new NEC code requires any cable support system to have supports that are spaced at no greater than twelve-inch intervals. This applies to cable trays, hangers or all other types of cable support systems. The old-style hangers with their open style loops can fall off easily during installation and also easily slide out of their twelve-inch spacing when loading the cables. This is a more serious problem when you consider that there are tens of thousands of hangers being installed in the desert heat which can reach 120 degree F. Any wasted labor is a high additional cost in this environment. The new unique captive closed loop locking arm on CAB's cable hangers securely retains the hanger in place even when bumped or knocked around during the cable installation process. This improved captive engagement will also keep cable hangers securely in position on the twelve-inch centers and eliminate the need to reposition hangers on twelve-inch centers after all cables have been loaded into the carriers of the hangers.

A major factor affecting labor costs during installation of cables is how easily the electrician can load the cables and bundles of cables in the hangers in the stifling heat of the desert where solar power plants are usually located. All styles of cable hangers presently on the market will easily swing from side to side as they are initially suspended on the messenger wire. This means an electrician must take one hand and properly align the hanger in a 90 degree perpendicular orientation to the messenger wire in order to load the cables or bundles of cables in the hanger with the other hand. This two handed process of aligning the hanger increases the time necessary to load cables over the thousands of feet of messenger wire with the hangers on twelve-inch centers. The newly designed captive top locking arm of the CAB cable hanger addresses this problem by always maintaining the hanger at a 90 degree orientation to the messenger wire on initial installation. The newly designed top locking arm totally eliminates any lengthwise swinging or traveling movement from side to side and allows the electrician to use both hands for the loading of cables and cable bundles. The new design feature will save many hours of labor in the field and improve efficiency by maintaining twelve-inch centers on the messenger wire when installing all types of cables or cable bundles.

The secure gripping top locking arm is a major improvement in hangers which can save hundreds of hours of labor on a large scale solar power plant; it greatly improves the efficiency of electricians and the quality of cable installations. Three major advantages of the new secure top locking installation arm are: the elimination of hangers falling off the messenger wires during loading, maintaining hangers at the proper orientation to the messenger wire for ease of cable loading, and maintaining the cable hanger on the messenger wire at the specified spacing for improved quality and speed of installation

BRIEF SUMMARY OF THE INVENTION

This invention has to do with a locking cable hanger and multiple cable carriers or saddles on one hanger.

The arrangement according to the present invention comprises a flexible wire of shape retention material formed so as to have an elongated u-shaped configuration forming a pair of spaced apart side arms extending from a closed configuration on one end to an open configuration on the other end. Cable supports (saddles) extend across the space between the side arms with co-operating elements of support and attachment between the cable supports and the side arms to support the cable supports on the wire hanger between the side at ins. Attachment sections are formed on each of the open ends of the spaced apart arms with the attachment sections being elastically shape resilient and flexible so as to be bent together for attachment to a messenger wire. The attachment sections comprise two loops, one of which wraps around the messenger wire to effectively lock it in place and the other an open loop which simply latches onto the messenger wire. Installation involves twisting the locking arm around the messenger wire to secured it in place, then squeezing the cable hanger from both sides to a point when the second loop goes past and under the messenger wire so when it is raised and released, the second loop forcefully engages the messenger wire.

This locking hanger and saddle system can have one to five individual separate saddles or cable supports arranged in either a vertical or horizontal configuration. The saddles can attach to the cable hanger in a variety of positions to provide a greater support area for cables and to allow for the separation of cable bundles. One cable hanger can include one to five saddles to accommodate up to five cables or bundles of cable separately. In the vertical design, the saddle can lay on the bottom of the ring or through a wire form retention designed to be attached anywhere from the bottom of the ring to the top of the ring. In this manner of construction, the spacing distance between the saddles can vary to any size to accommodate any size cable or cable bundle. In the horizontal design the saddle would lay on the bottom of the hanger for additional cable support.

The locking saddle and hanger assembly according to the present invention also includes the option of an integrated closed loop on the top of the hanger which is used to safely hold category five cables or other small wiring in an area separate and has a good distance from the bundles of power cables. In this manner of construction, the more sensitive fiber-optic or control wires are retained in a separate carrier at least one-inch from the bundles of power cables in the horizontal or vertical design of this cable ring in saddle arrangement. The distance of separation will ensure there is no signal strength loss or interference on the category five cables from the power cables.

The saddle and hanger system according to the present invention also includes the option of a total or partial coating of PVC, plastisol, or other style coating on the saddle and hanger assembly. The PVC coating is a high dielectric grade and flame retardant. The coating has UV inhibitors for the more demanding environments of solar power plants in desert locations and for improved performance and highly corrosive environments. The total PVC coating on the cable hanger assembly provides additional corrosion resistance and protection of cables; it also add stability by providing a more secure grip of the top attachment loops to the messenger wire. A totally PVC coated single or multiple cable ring and saddle assembly is also easier to handle and install with a heavy 50 to 100 mil inch thick PVC coating over the entire surface. This coating helps to retain all saddles in a fixed position which eliminates the chance of loose saddles moving out of position during installation. The PVC coating is 50 to 100 mils inch thick which also has the added benefit of providing cushioning for the hands when squeezing in installing the cable hanger on the messenger wire. This benefit improves efficiency by allowing more cable hangers to be installed and significantly reduces the fatigue factor of the hand.

Materials used for the cable hangers include high tensile spring steel such as class 50 galvanized steel, copper clad steel, or type 316 stainless steel. Material can be 0.125 to 0.250 inch diameter high tensile spring steel, round or rolled flat wire form. This high quality material provides maximum strength with a smooth, flat surface for the support of cables and rounded edges for the protection of cable jackets.

OBJECTS OF THE INVENTION

It is an object of the present invention to provide a cable support system that can be easily installed and remain captive on the messenger wire during installation of cables thereby improving efficiency of labor in the solar, mining, and electrical industries.

It is the object of the present invention to provide a cable support system that maintains the position of the hanger at a specified spacing on the messenger wire to improve the quality and efficiency of cable installations.

It is an object of the present invention to provide a cable support system that will consistently maintain a cable hanger in the proper 90 degree orientation to the messenger wire for ease of loading cables and cable bundles by electricians.

It is an object of the present invention to provide a new safe and more efficient hanger system for the solar, mining, and electrical industries.

It is an object of the present invention to provide a new multiple cable hanger system for the solar, mining, and electrical industries.

It is an object of the present invention to provide a new hanger system that greatly reduces installation labor time for the solar, mining, and electrical industries.

It is a further object of the present invention to provide a more organized system to support cables in the solar, mining, and electrical industries.

It is a further object of the present invention to provide a cable support system that provides a safer, secure, strong, and effective separation of cables and wires so as to protect the electrical performance of cables in the solar, mining and electrical applications.

It is a further object of the present invention to provide a stronger, more corrosion resistant cable management system for the solar, mining, and electrical industries.

It is a further object of the present invention to provide a more flexible cable management system for multiple bundles of cables of different sizes for the solar, mining, and electrical industries.

It is a further object of the present invention to provide a safer cable management system for communication, control and electrical cables for the solar, mining, and electrical industries.

DETAILED DESCRIPTION OF DRAWING

Figure 1:
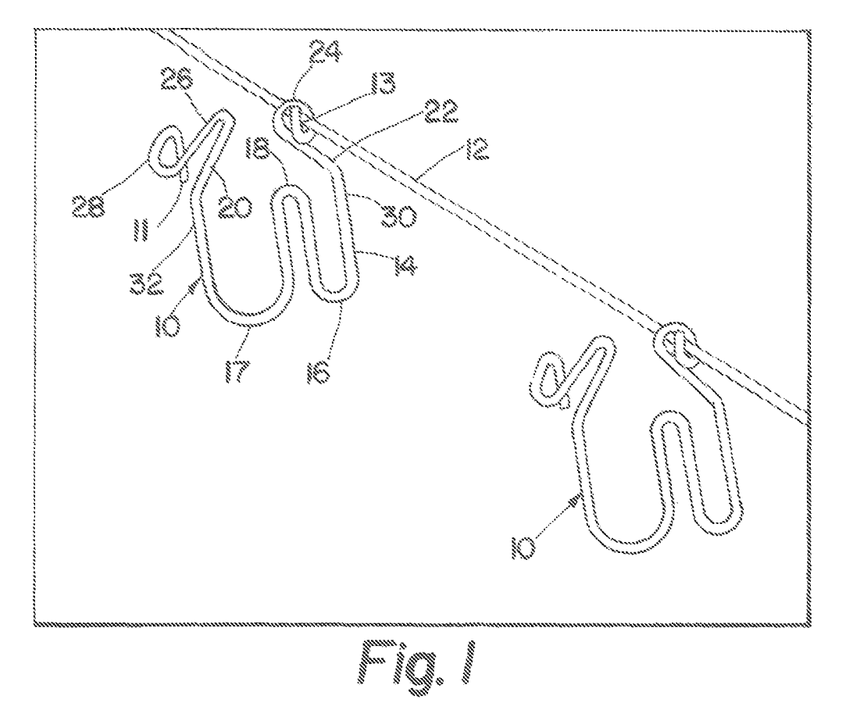
FIG. 1 is an environmental perspective showing one end of the hanger according to the present invention engaged on a cable.

Shown in FIG. 1 is an environmental perspective showing a hanger 10 according to the present invention. The hanger 10 has a spiral gripper 24 that is engage with the messenger wire 12. The hanger 10 is formed of a wire 14 that has opposing ends 11 and 13 that has been bent into a U-shaped configuration to form at least one (one to sometimes five) cable carrier formations 16, 17 with a cable carrier divider 18 separating cable carrier formations 16 and 17. The hanger 10 has shoulders 20 and 22 that extend towards each other from the lateral opposing sides 30 and 32 of the hanger 10. Formed on the distal end of shoulder 22 is the spiral gripper 24 that engages the messenger wire 12. Formed on the distal end of shoulder 20 is the locking hook 26 that has the data carrier loop 28 formed on its distal end. The cable carrier formations 16, 17 are of the same or different widths so that different cable sizes may be loaded onto the hanger 10 prior to it being locked in place. A similar hanger 10 is shown further down the messenger wire 12 to show how the cable may be loaded into several hangers prior to the top locking loop 26 being engaged with the messenger wire 12. The wire 14 used for the hanger 10 is selected from the group consisting of round or flat rolled galvanized or stainless steel spring material. The wire 14 will have a shape memory retention property so as to provide a locking force when both the spiral gripper 24 and the locking hook 26 are engaged with the messenger wire 12. In order to fully engage the hanger 10 with the messenger wire 12 lateral sides 30 and 32 must be squeezed so that shoulders 20 and 22 come towards each other and the locking hook 26 comes under the messenger wire 12 so that when the squeezing of the hanger 10 is released the locking hook 26 will engage the messenger wire as is more formally shown in FIG. 2.

Figure 2:
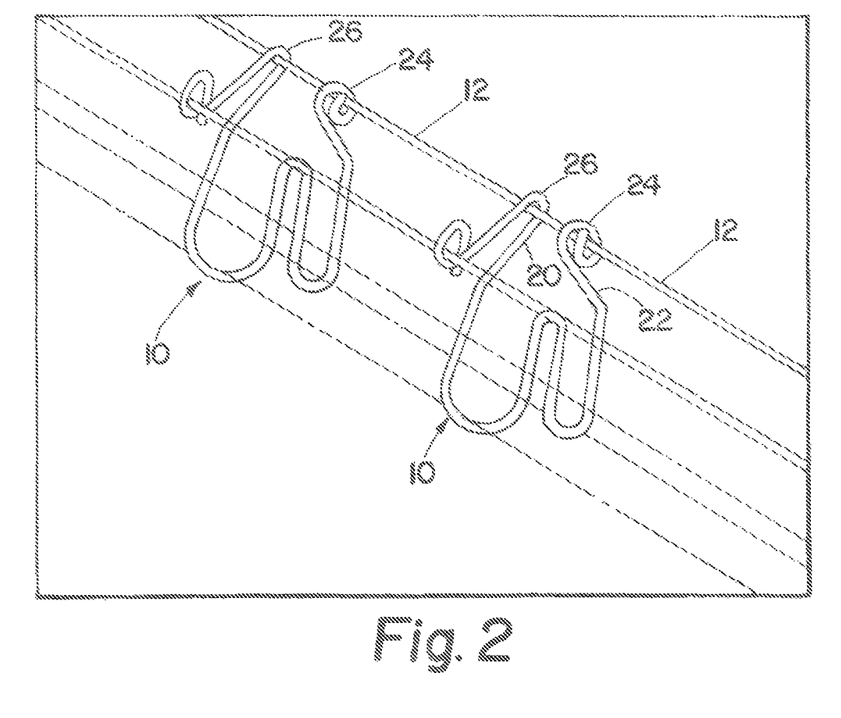
FIG. 2 is an environmental perspective showing the fully mounted hanger according to the present invention.

FIG. 2 is an environmental perspective view showing the hanger 10 fully mounted on the messenger wire 12. The spiral gripper 24 is engaged with the messenger wire 12 and the locking loop 26 is also fully engage with the messenger wire 12. The spiral gripper 24 has at least two interference abutment surfaces that will but with messenger wire 12 to hold the hanger 10 in place on the messenger wire 12. The locking loop locking hook 26 has at least one abutment surface that engages the messenger wire 12 and it is the spring force exerted by the wire material that urges shoulders 20 and 22 apart and causes a locking force to be exerted between the abutment surface on locking hook 26 and the two abutment surfaces on the spiral gripper 24.

Figure 3:
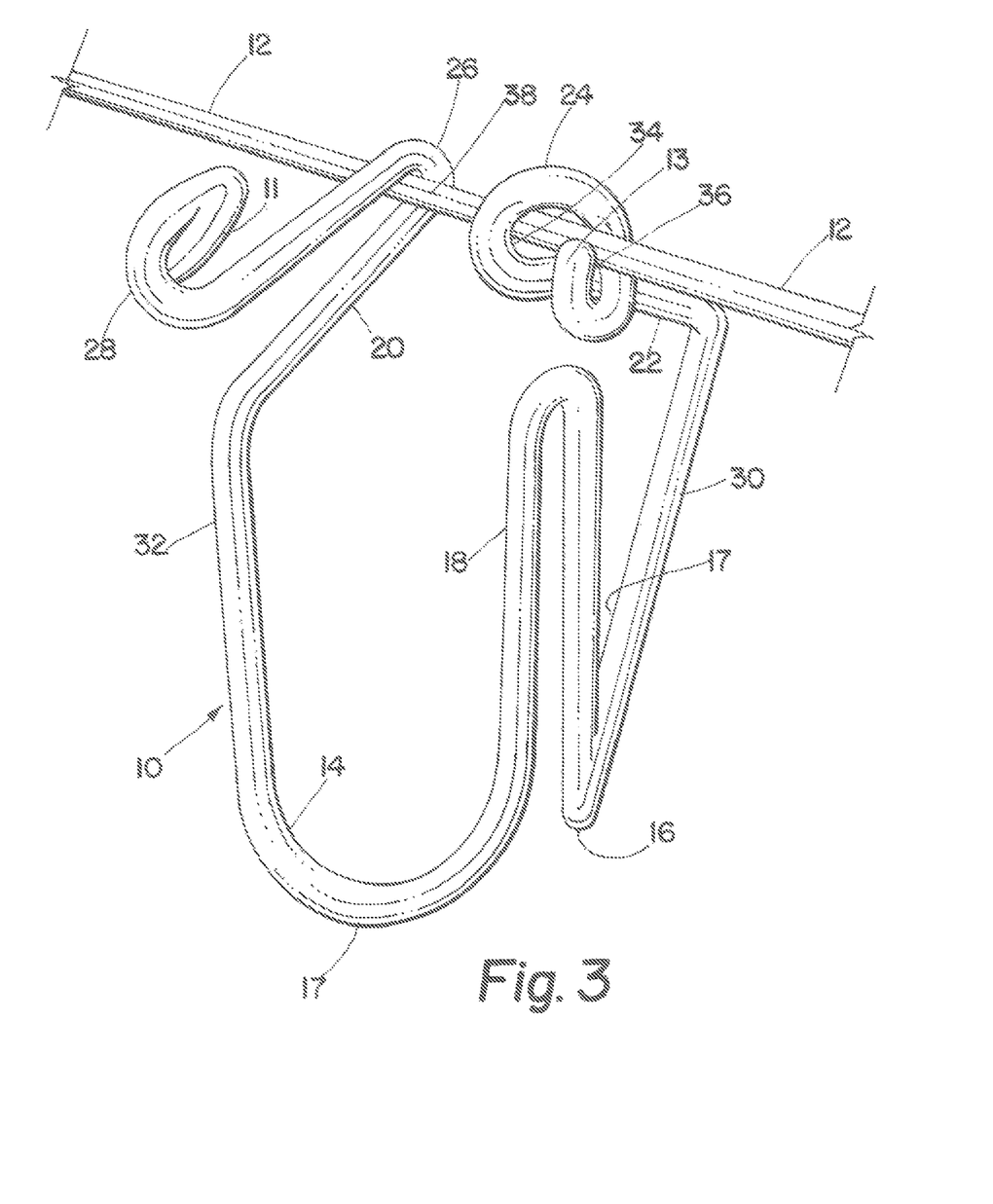
FIG. 3 is a perspective showing a double carrier hanger according to the present invention.

FIG. 3 is an enlarged perspective view of the hanger 10 according to the present invention as it is attached to the messenger wire 12. The hanger 10 is shown having to cable carrier formations 16, 17 with cable divider 18 shown separating the carrier formations 16, 17. Shoulders 20 and 22 are shown extending towards one another from the lateral sides 30 and 32 of the hanger 10. Formed on the distal end is a spiral gripper formation 24 that terminates in end 13 of the wire 14 that is used to form the hanger 10; the spiral gripper formation 24 and has at least two messenger wire abutment surfaces as is shown at 34, 36 such that when the locking hook 26 is engaged with the messenger wire 12 the abutment surface surfaces 34 and 36 on the spiral gripper 24 will engage the messenger wire 12 in such a way as to prevent sliding movement along the messenger wire 12; the locking hook 26 has its distal end 11 and formed on that distal end is a data carrier loop 28 for carrying the data information wire along the same path as the messenger wire. What is important is that the hanger 10 provides a sufficient separation between both cable carrier formations 16, 17 and a further sufficient separation between the two carriers formations 16, 17, and the data carrier loop 28 as can be seen when engaged the shoulders 20, 22 have been compressed, preferably by an installer and gripping the outer and squeezing them such that the locking hook 26 and data carrier loop 38 have gone under the messenger wire 12 and then are raised so that when the spring wire 14 is released the locking hook 26 then has an abutment surface 38 that firmly engages the messenger wire 12 and creates a locking force on the messenger wire 12 between the abutment surfaces 34, 36, and 38.

Figure 4:
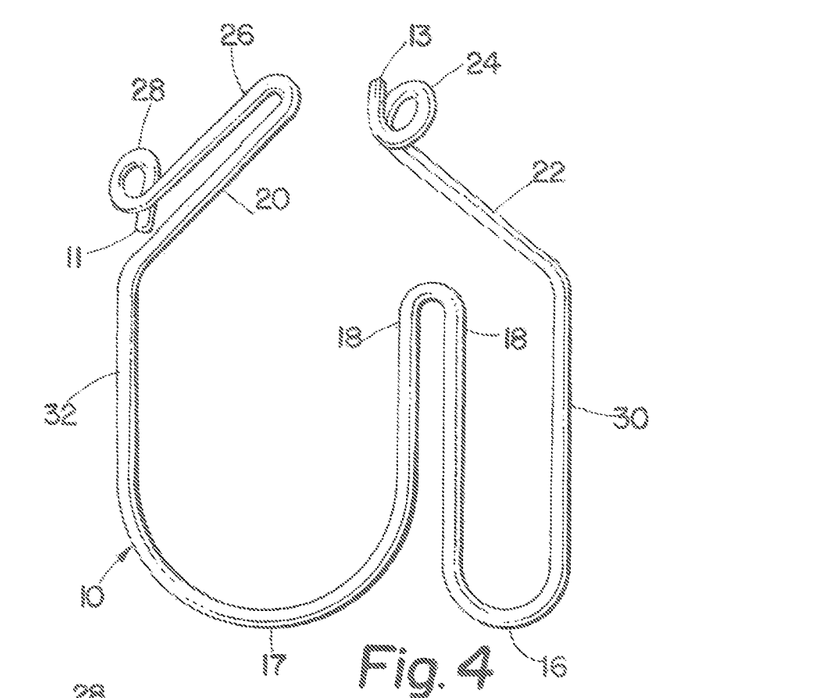
FIG. 4 is a front view of a hanger according to the present invention.

What is shown in FIG. 4 is a side view of the hanger 10 according to the present invention. The hanger 10 has a first cable carrier formation 16 and a second cable carrier portion 17. The cable carrier formations 16, 17 are located immediately adjacent to one another with a cable carrier divider 18 located between the two cable carrier formations 16, 17. Lateral sides 30 and 32 are shown on the hanger 10 with lateral sides having shoulders 22 and 20 that extend from the upper end of the lateral sides 30 and 32 towards one another. The distal end of the shoulder 22 has the spiral wound gripper 24 formed thereon with the wire end 12 shown therein. The shoulder 20 extends from the lateral side 32 and forms the locking hook 26 which has at its distal end the data carrier loop 28, the opposing ends 11 of the wire 14 shown therein.

Figure 5:
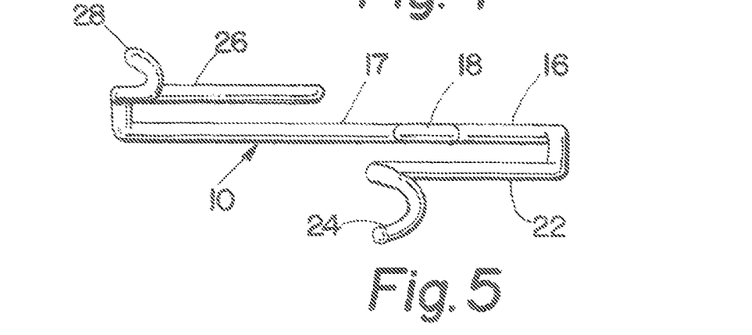
FIG. 5 top view of a hanger according to the present invention.

What is shown in FIG. 5 is a top view of the hanger 10 according to the present invention. The data carrier wire formation 27 is shown formed at the end of the locking hook 26. The top of the cable carrier divider 18 is shown separating the cable carrier formations 16, 17. The shoulder 22 is shown extending out to the spiral gripper 24.

Figure 6:
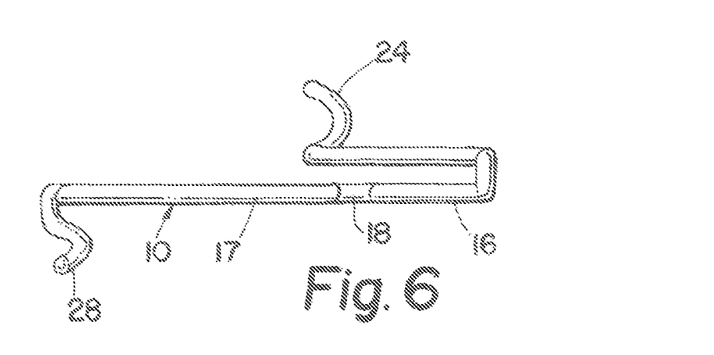
FIG. 6 is a bottom view of the hanger according to the present invention.

What is shown in FIG. 6 is a bottom view of the hanger 10 according to the present invention. The cable carrier divider 18 is shown dividing the cable carrier formations 16 and 17 with the spiral gripper 24 and the data carrier loop 28 shown formed thereon.

Figure 7:
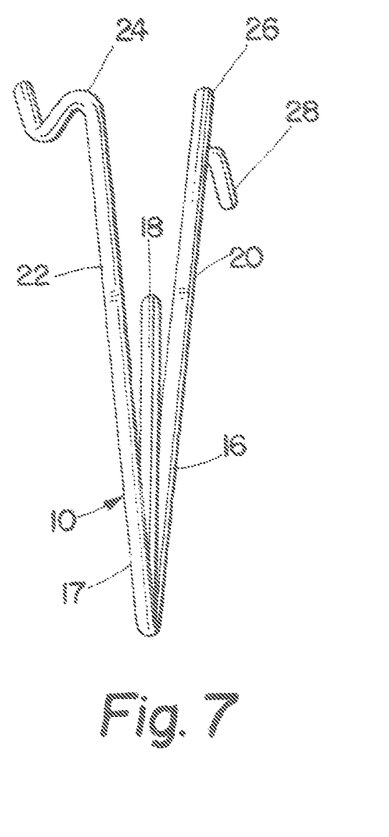
FIG. 7 is left end view of a hanger according to the present invention.

Shown in FIG. 7 is a left end view of the hanger 10 according to the present invention. The hanger 10 is shown with the cable carrier divider 18 dividing the cable carrier formations 16, 17, the shoulders 22, 20 shown leading to the spiral gripper 24 and forming the locking loop locking hook 26. The locking hook 26 has the data carrier loop 28 formed thereon.

Figure 8:
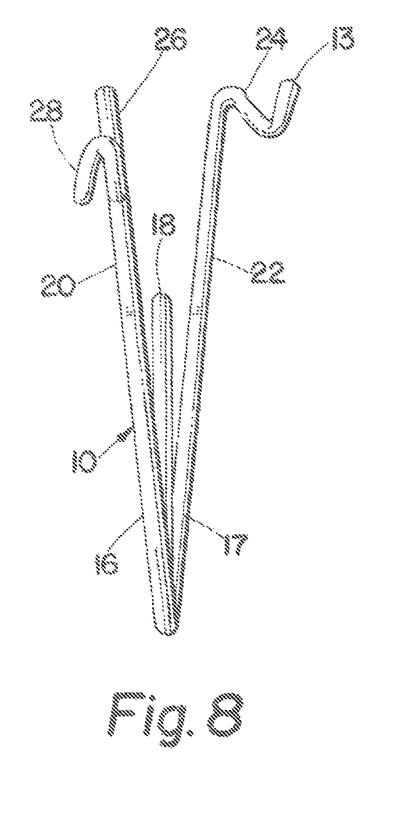
FIG. 8 is right end view of a hanger according to the present invention.

What is shown in FIG. 8 is a right end view of the hanger 10 according to the present invention. The hanger 10 is shown for the cable carrier divider 18 dividing the carrier formations 16, 17 with a shoulder 22 leading up to the spiral gripper 24 and showing the opposing end 13 of the wire 14. Also shown is the shoulder 20 that leads up to the locking hook 26 which has the data carrier loop 28 formed on its distal end.

Figures 9, 9A, 10:
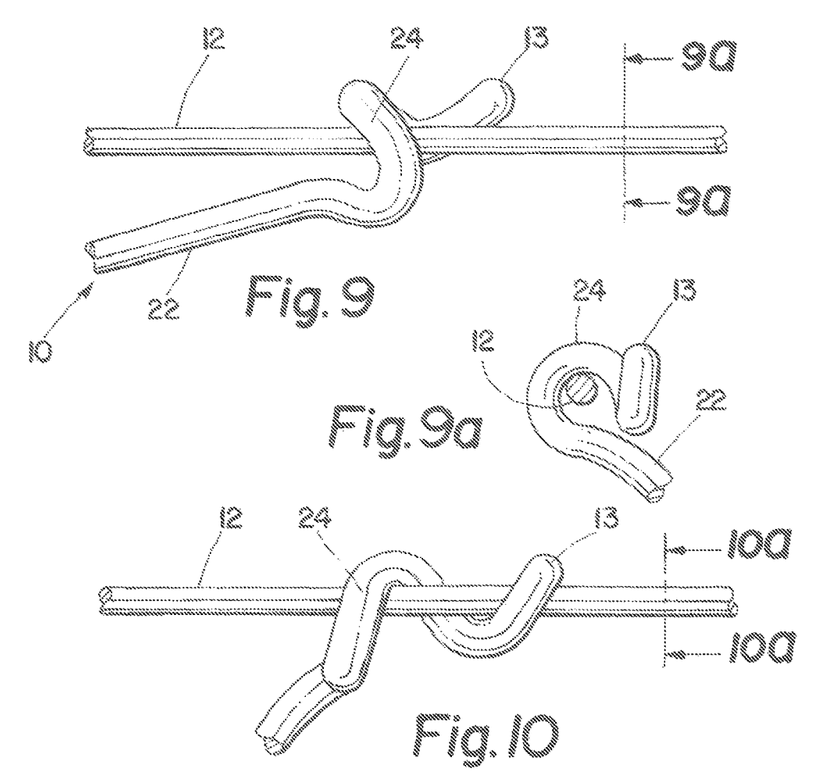
FIG. 9 is a fragmentary view showing the first position in mounting a hanger according to the present invention.
FIG. 9a is another fragmentary view showing the first position in mounting a hanger.
FIG. 10 is a fragmentary view showing the second position in mounting a hanger according to the present invention.

What is shown in FIGS. 9 and 9A is a fragmentary view showing the first position of engaging the hanger 10 with the messenger wire 12. The shoulder 22 of the hanger 10 is held closely adjacent to the messenger wire 12 and the spiral gripper 24 is placed down over the messenger wire with the end 13 to the far side of the messenger wire 12. FIG. 9 shows this result more clearly that the end 13 of the spiral gripper 24 is now at or below the level of the messenger wire 12 and the spiral gripper 24 is mounted on the messenger wire 12

Figure 11:
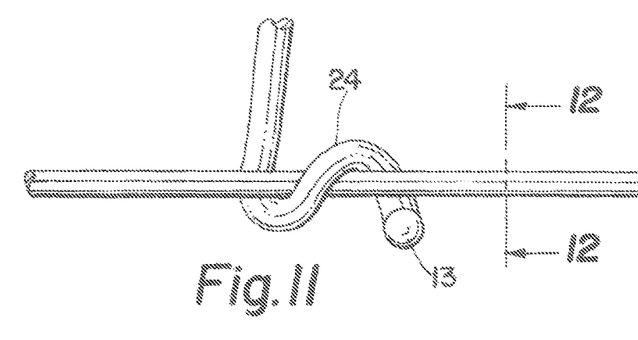
FIG. 11 is a fragmentary view showing the final position in mounting a hanger according to the present invention.
Figure 12:
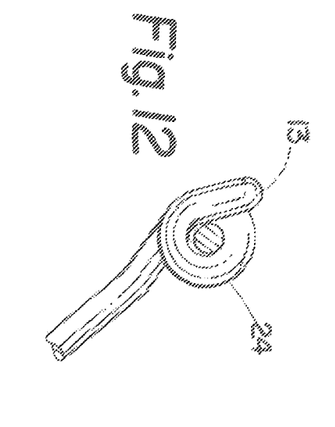
FIG. 12 is a cross-section of the hanger according to the present invention taken on the line 12-12 from FIG. 11.

What is shown in FIGS. 10-12 is a view of the hanger 10 as originally shown in FIGS. 9 and 9A but with the shoulder 22 having been pushed under the messenger wire 12, to the opposite side of the messenger wire 12, and has rotated the end 13, also under the messenger wire 12, and end 13 is now projecting on the other side as is shown in FIG. 12 in this manner to captively hold the hanger 10 on the messenger wire 12.

FIG. 11 is a fragmentary view showing the final position in mounting a hanger according to the present invention. Shown in FIG. 11 is the messenger wire 12 having the hanger 10 actually hanging on the messenger wire 12; the spiral gripper 24 is shown surrounding the messenger wire 12 of its end 13 pointing upward.

FIG. 12 is a top view of the hanger 10 according the present invention on the messenger wire 12.

Figure 13:
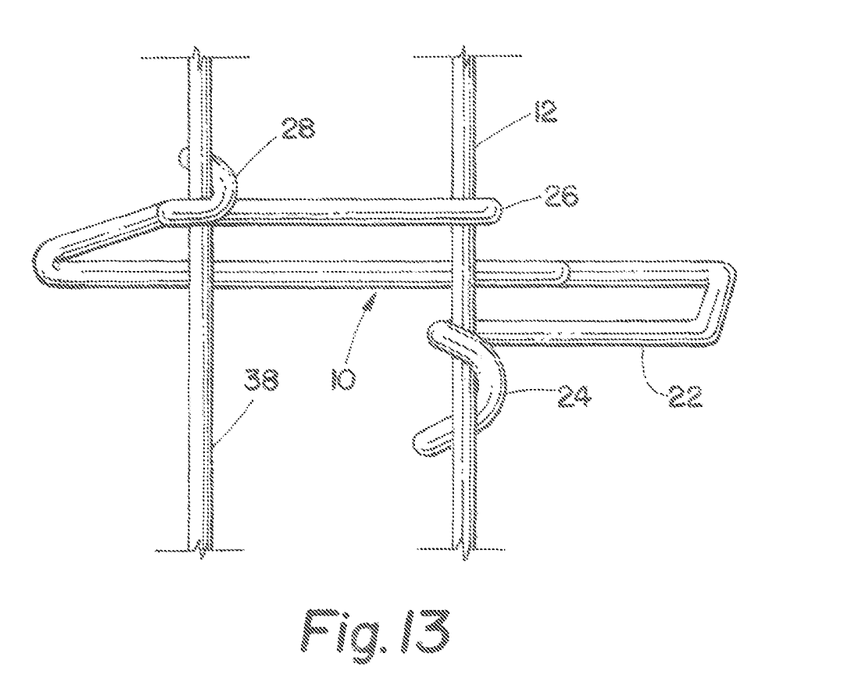
FIG. 13 is a top view of the hanger according to the present invention device mounted on a cable and supporting another cable.

FIG. 13 is a top view of the hanger 10 according to the present invention, with the hanger mounted on the messenger wire 12 and supporting the data carrier wire 38. As is shown in FIG. 13, messenger wire 12 has a hanger 10 firmly held in place by the spiral gripper 24 and the locking hook 26 firmly engaged with the messenger wire 12. The previous steps in the above FIG. 10 maneuvered the shoulder 22 such that the spiral gripper 24 was placed on the messenger wire 12. Cables have been loaded into the cable carrier and the locking loop 26 was brought through and under the messenger wire 12 and then released. Once released, the shape memory material would cause the wire to spring back to its initial state and engage the messenger wire 12. Shown opposite the spiral gripper 24 and the locking hook 26, is the data carrier loop 28 carrying the data wire 38.

Figure 14:
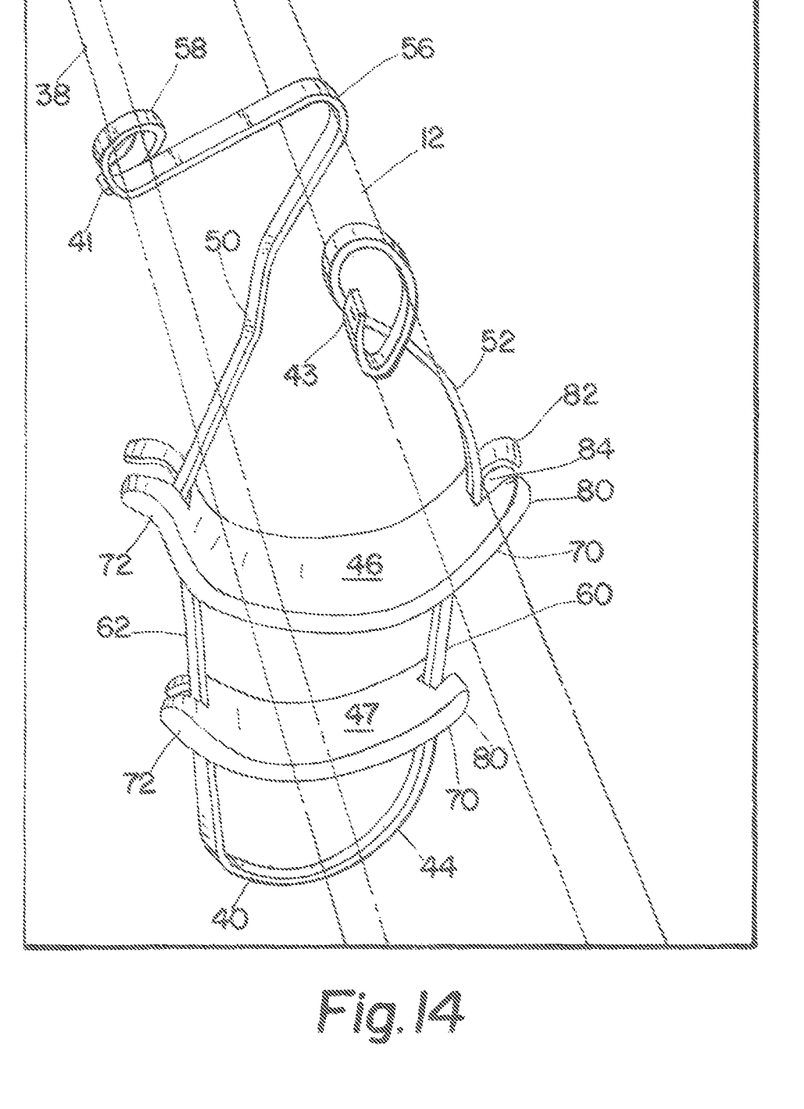
FIG. 14 is a perspective view of an uncoated, vertically mounted double carrier hanger according to the present invention.

FIG. 14 is a perspective of an alternate hanger 40 according to the present invention. What is shown in FIG. 14 is an alternate hanger 40 that is made of a wire 44 that is either round or flat rolled stainless steel, or flat rolled galvanized steel, that has been formed in the U-shaped configuration having upper shoulders 50, 52 that extend from lateral sides 60 and 62 of the U-shaped formation. On the end of shoulder 52 is spiral gripper 64 that engages the messenger wire 12. The wire has an ends 41, 43 as shown in FIG. 14. The data wire 38 is shown engaging the data carrier loop 58. The hanger 40 has a spiral gripper 64 and a locking loop 56 that engages the messenger wire 12 to hold a hanger 40 firmly in place. Cable carrier saddles 46 and 47 are shown engaged with and supported from lateral sides 60 and 62. The saddles 46 and 47 each have opposing ends 70 and 72 with separate ear formations 80 and 82 formed thereon. The separate ear formations 80 and 82 have a slot formed that fits around the lateral side 60 of the hanger 40. The ears 80 and 82 are then crimped towards one another so as to permanently hold the saddles 46 and 47 in place on each lateral side 60 and 62 of the hanger 40. As will be seen later the lateral sides 60 and 62 of the U-shaped formation of the hanger 40 may be bent inwardly at the junctures with a side 70, 72 of the saddles 46 or 47 so as to better support the cable saddles on the hanger 40.

Figure 15:
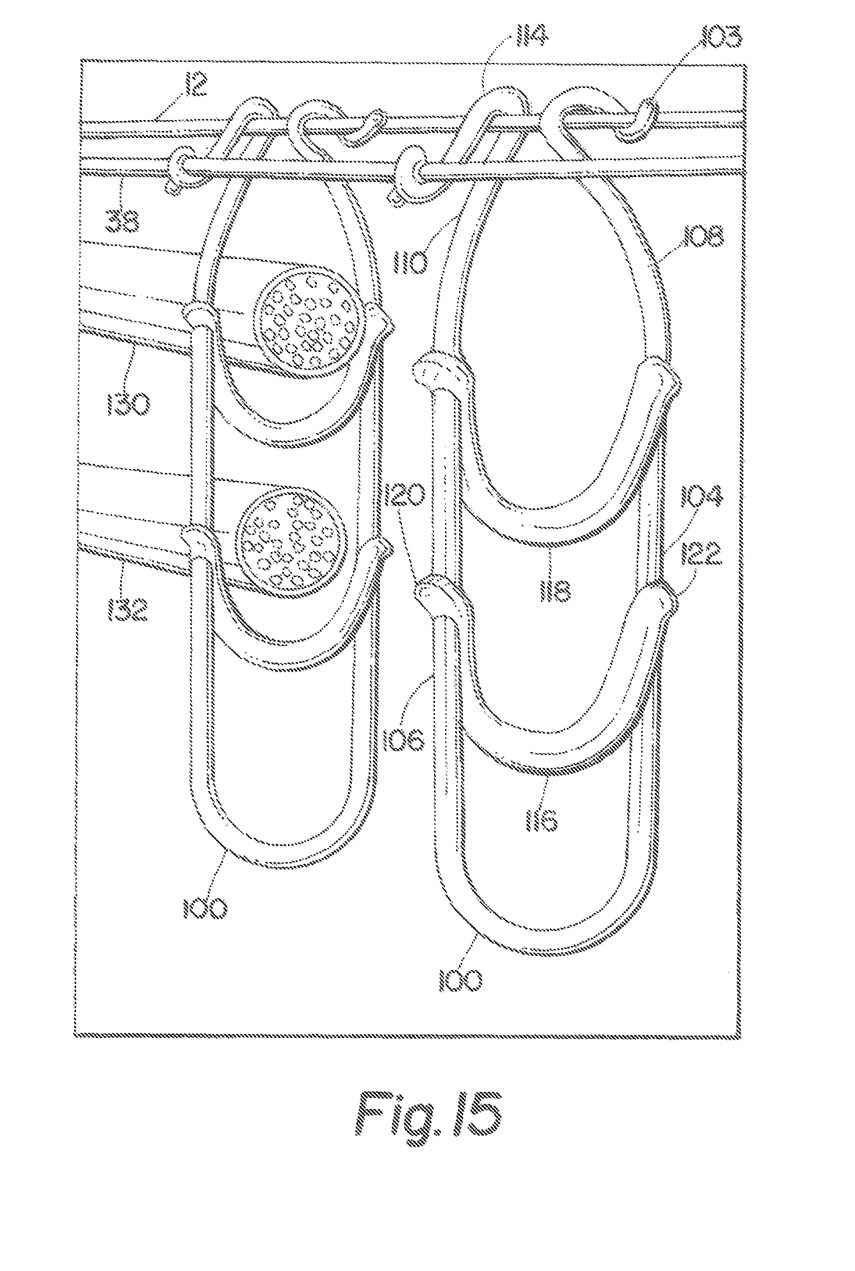
FIG. 15 is a perspective view of a PVC coated, vertically mounted double carrier hanger according to the present invention.

FIG. 15 is a perspective of two alternate hanger's 100 according to the present invention. Shown in FIG. 15 are hangers 100 that are attached to a messenger wire 12 and carry data wire 38. The hangers 100 are formed of a wire 102 that has been bent in the U-shaped formation to have to have lateral sides 104 and 106, the lateral sides 104 and 106 each have, respectively, upper shoulders 108 and 110. The upper shoulder 108 ends with a spiral gripper 112 with the end of the wire shown at 103. The spiral gripper 112 is shown engaging the messenger wire 12. The upper shoulder 110 of hanger 100 has a locking loop 114 with a data carrier loop 116 formed thereon, the end of the wire on the lateral shoulder side 106 is labeled 101. Hangers 100 are coated with a plastisol coating that has a high flame retardant, high UV resistance, and high dielectric value. Saddles 116, 118 are shown with ends 120 and 122 attached to the lateral sides 104 and 106 of the one hanger 100; cables 130 and 132 are shown as they would be placed and suspended by the hangers 100.

Figures 16, 17, 18, 19:
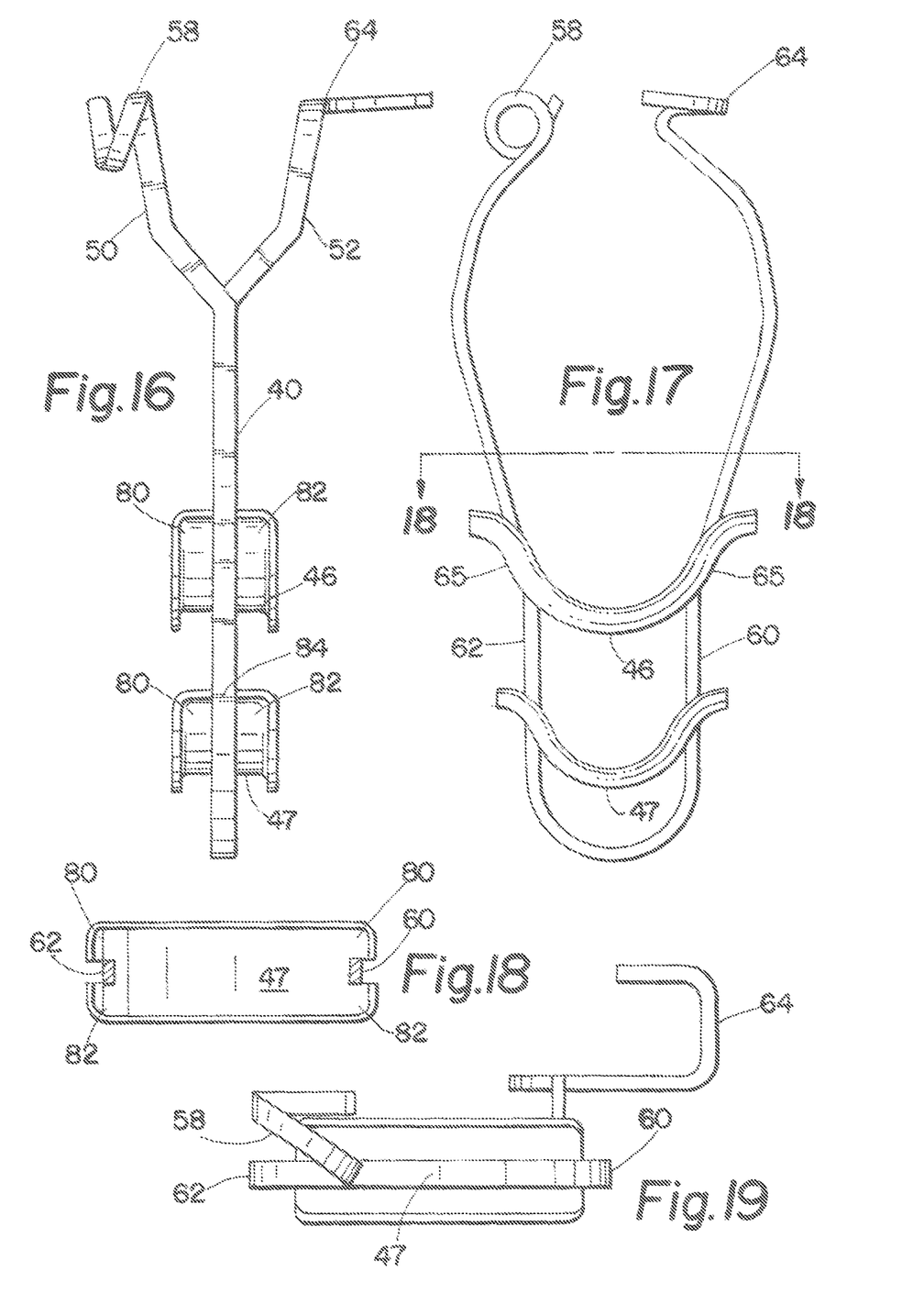
FIG. 16 is a left end view of an uncoated, vertically mounted hanger according to the present invention.
FIG. 17 is a front view of an uncoated, vertically mounted hanger according to the present invention.
FIG. 18 is a cross-section taken on the line 18-18 of FIG. 17 of the hanger according to the present invention.
FIG. 19 is a bottom view of an uncoated, vertically mounted hanger according to the present invention.

Shown in FIG. 16 is the alternate hanger 40 shown in a side view. The alternate hanger 40, shows the lateral side 60 with the saddles 46 and 47 attached to the lateral side 60. The saddles 46, 47 have ears 80, 82 formed upon each of the saddles 46 and 47 such that the slot 84 engages the lateral side 60 of the hanger 40 is shown having upper shoulders 50, 52 with the shoulder 52 having a spiral gripper 64 shown thereon and the data carrier loop 58 shown at the end of shoulder 50. Shown in FIG. 17 is a front view of the hanger 40 shown in FIG. 16 with the data carrier loop shown at 58 and spiral gripper shown at 64, saddles 46 and 47 are shown attached to the lateral sides 60 and 62 of the hanger for the U-shaped hanger 40.

FIG. 17 is a front view of an uncoated, vertically mounted hanger 100 according to the present invention. In FIG. 17 each of the lateral side 60 and 62 is shown being bent inward at 65 so as to add an additional support from the lateral sides 60 and 62 to the bottom of the saddle 46 while the ears 80 and 82 will be crimped around the lateral side 60 and 62 of the U-shaped hanger 40. The additional bands at 65 of the lateral sides 60 and 62 will add support to the carrier 46 when a cable is loaded into the top of saddle 46.

FIG. 18 is a cross-section taken on the line 18-18 of FIG. 17 of the hanger 40 according to the present invention, shown in FIG. 18 having the ears 80 and 82 engaged with the lateral side 60 and 62 of the hanger 40.

FIG. 19 is a bottom view of an uncoated, vertically mounted hanger 40 according to the present invention.

Figure 20:
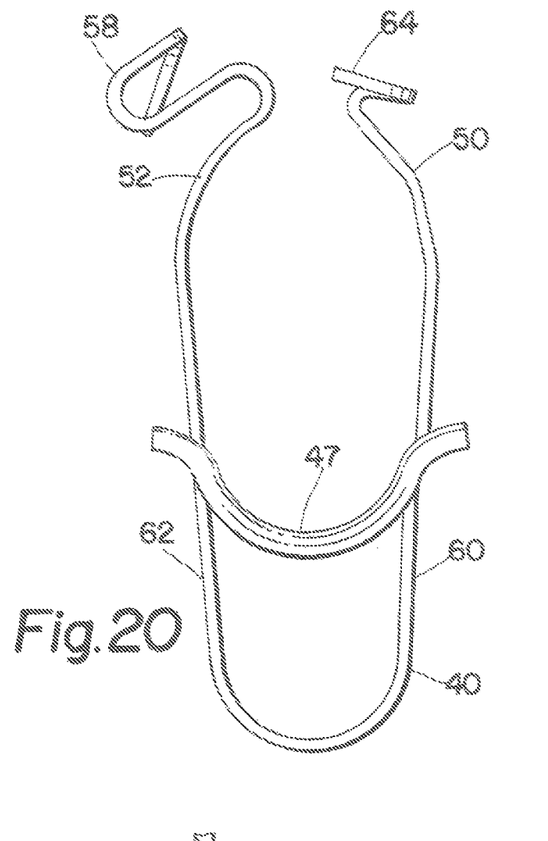
FIG. 20 is a front view of an uncoated, vertically mounted hanger according to the present invention.

FIG. 20 is a front view of an uncoated, singly mounted hanger 40 according to the present invention. The hanger 40 shown in FIG. 20 has U-shaped lateral sides 60, 62: a single saddle 46 between the lateral side 60, 62; the data carrier loop 58 is shown formed on the upper shoulder 52 with the spiral gripper 64 shown in the upper part of shoulder 50.

Figure 21:
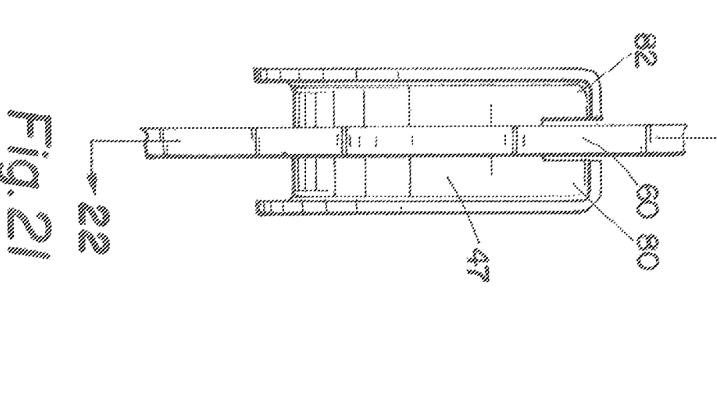
FIG. 21 is a fragmentary side view showing the crimp in the legs of the hanger according to the present invention that keeps the saddle in place.
Figure 22:
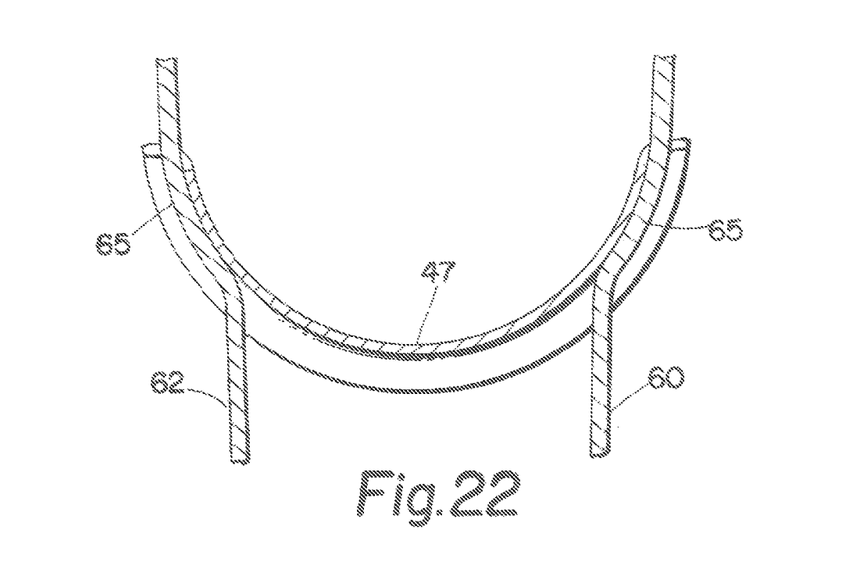
FIG. 22 is a cross-section taken on the line 22-22 of FIG. 21 of the hanger according to the present invention.

FIGS. 21 and 22 show the bends in the lateral side 60 and 62 that is used to hold the saddle 47, on the lateral sides 60 and 62 is a fragmentary side view showing the crimp in the legs of the hanger 40 according to the present invention that keeps the saddle in place.

FIG. 22 is a cross-section taken on the line 22-22 of FIG. 21 of the hanger according to the present invention.

Figure 23:
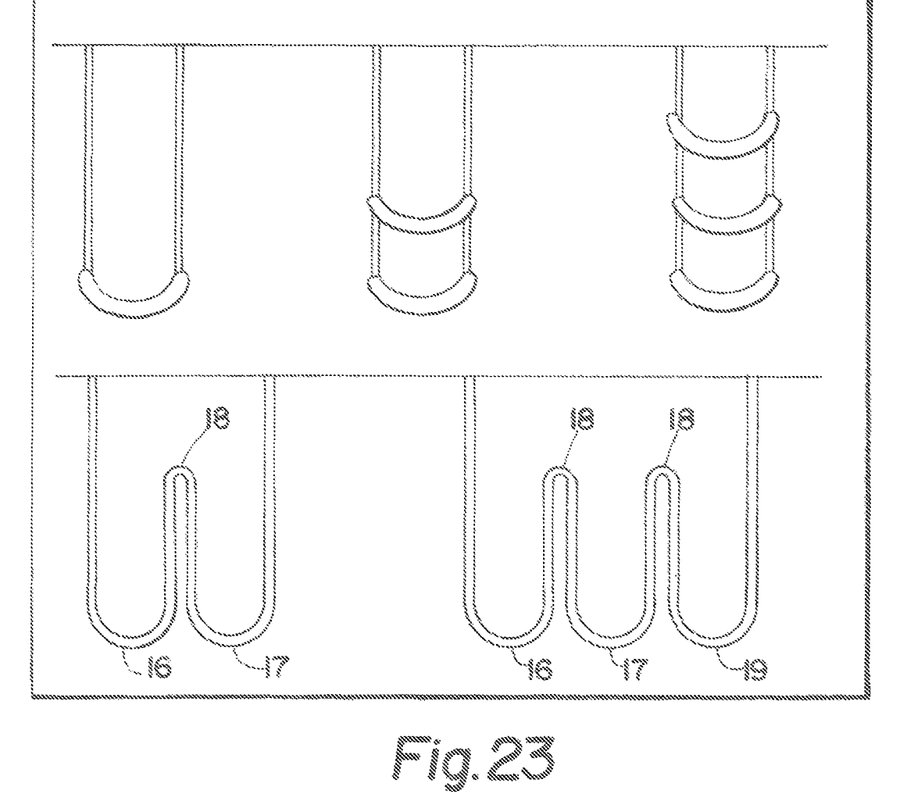
FIG. 23 is a diagrammatic view showing various permutations of vertical and horizontal hangers according to the present invention.

FIG. 23 is a diagrammatic view showing various permutations of vertical and horizontal hangers according to the present invention. As can be seen in FIG. 23 it is within the contemplation of this invention that whether the hangers 10, 40 or 100 are furnished with the spiral gripper and locking hook there are many configurations of vertical and horizontal saddle or carry arrangements that can be utilized with this type of locking hanger. The upper part of FIG. 23 shows that a vertically oriented hanger can have saddle supports of one, two, three or more, that can be attached to a cable messenger wire. The lower part of FIG. 23 shows that the horizontal carrier formations 16 and 17 may be formed using a single carrier formations 16, double carrier formations 16, 17 or a triple or more carrier formation of 16 17 and 19. Each of the carrier formations 16, 17 will have a carrier divider 18 formed between each of the carrier formations. Horizontal oriented hangers can have one, two, or three, or more cable carriers.

Figure 24:
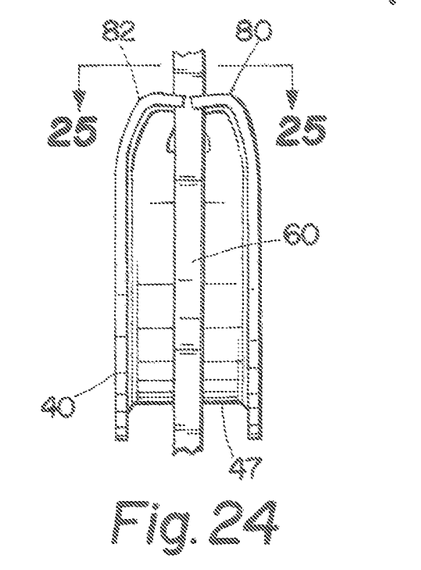
FIG. 24 is a fragmentary side view showing the crimp-locking method of keeping a hanger according to the present invention in place
Figure 25:
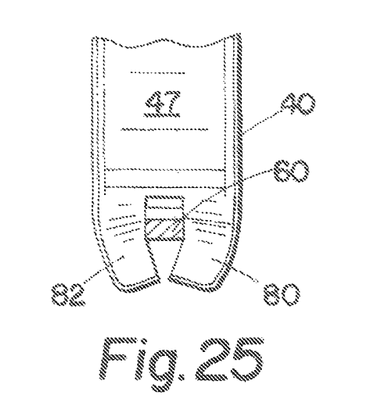
FIG. 25 is a fragmentary cross-section taken on the line 25-25 of FIG. 24 of the hanger according to the present invention.

FIGS. 24 and 25 are a fragmentary side view of a hanger 40 showing the crimp-locking method of keeping a saddle supported in place according to the present invention. Shown in FIG. 24 is a saddle 47 with the ears 80 and 82 shown crimped around the lateral side 60 of the hanger 40.

FIG. 25 is a fragmentary cross-section taken on the line 25-25 of FIG. 24 of the hanger 40 according to the present invention.

Figure 26:
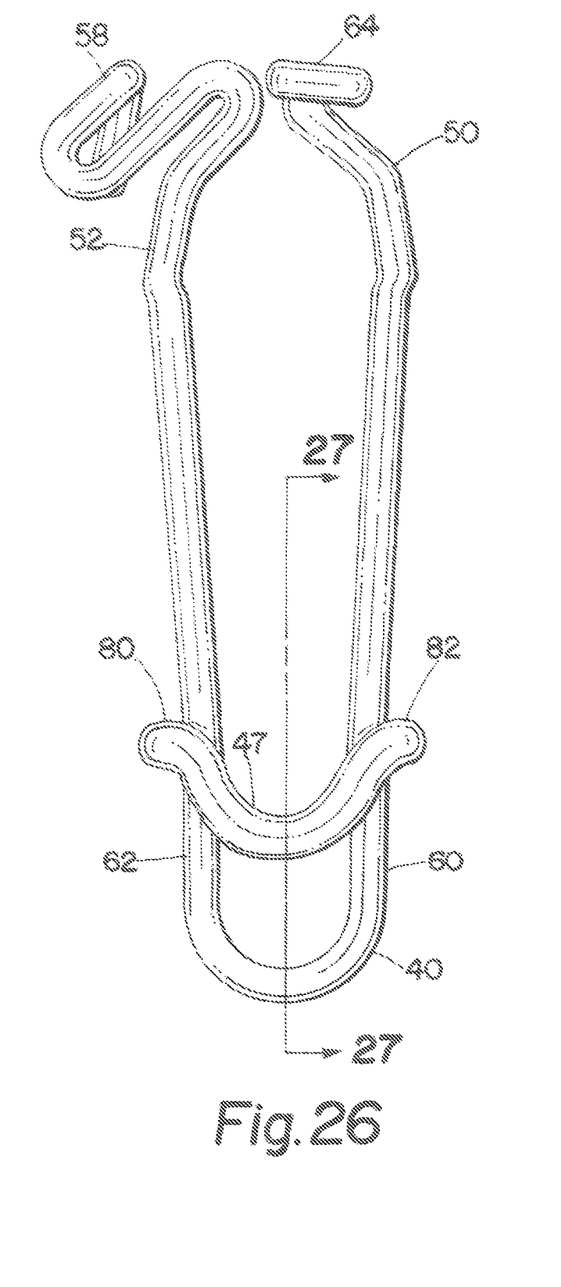
FIG. 26 is a front view of a coated, single mount hanger according to the present invention.

FIG. 26 is a side view of a coated, single mount hanger 40 according to the present invention.

Figure 27:
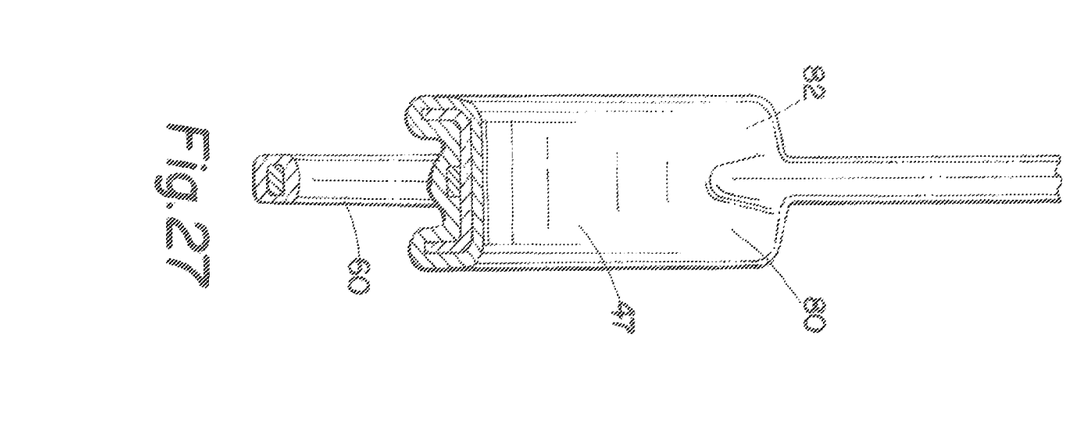
FIG. 27 is a fragmentary cross-section taken on the line 27-27 of FIG. 26 of the hanger according to the present invention.

FIG. 27 is a fragmentary cross-section taken on the line 27-27 of FIG. 26 of the hanger according to the present invention.

The invention claimed is:

1. A cable hanger which comprises:
   a high tensile strength wire with two opposing ends and cable carrying formations located intermediate of said ends;
   one of said wire ends having a spiral gripper formation for engaging a messenger wire; and
   the opposite of said one wire ends formed with a locking hook for engagement with the same messenger wire, wherein adjacent cable carrying formations are separated by cable carrier dividers.

2. The cable hanger of claim 1 wherein said cable carrying formations are horizontally adjacent cable carrying formations.

3. A cable hanger which comprises:
   a high tensile strength wire with two opposing ends and cable carrying formations located intermediate of said ends;
   one of said wire ends having a spiral gripper formation for engaging a messenger wire; and
   the opposite of said one wire ends formed with a locking hook for engagement with the same messenger wire, wherein said locking hook includes a data carrier wire formation.

4. The cable hanger of claim 3 wherein said data carrier wire formation is a data carrier loop.

5. A cable hanger which comprises:
   a high tensile strength wire with two opposing ends and configured intermediate of said ends to form at least one substantially U-shaped configuration;
   cable carrying formations located on said U-shaped configuration;
   opposite shoulders extending toward each other from said spaced apart opposite sides;
   one of said shoulders having a spiral gripper formation for engaging a messenger wire formed on its distal end;
   the opposite of said one shoulder formed with a locking hook for engagement with the same messenger wire;
   said spiral gripper wound so as to surround and have at least two interference abutment surfaces with the messenger wire when installed thereon;
   said spiral gripper cooperating with said locking hook when both are engaged with the messenger wire so as to securely hold said hanger on said messenger wire; and
   a data carrier wire formation formed on the distal end of said locking hook.

6. The cable hanger of claim 5 wherein adjacent cable carrying formations are separated by cable carrier dividers.

7. The cable hanger of claim 6 wherein said cable carrying formations are horizontally adjacent cable carrying formations.

8. The cable hanger of claim 5 wherein said data carrier wire formation is a data carrier loop.

9. The cable hanger of claim 5 wherein said end of said wire at said spiral gripper extends upwardly.

10. A cable hanger which comprises:
- a high tensile strength wire with two opposing ends and cable carrying formations located intermediate of said ends;
- opposite shoulders extending toward each other from spaced apart opposite sides of said cable carrying formations;
- one said shoulder formed with a locking hook for engagement with a messenger wire; and
- wherein said cable carrying formations includes a plurality of cable carrying formations separated by cable carrier dividers.

11. The cable hanger of claim 10 wherein adjacent cable carrying formations are separated by cable carrier dividers.

12. The cable hanger of claim 11 wherein said cable carrying formations are horizontally adjacent cable carrying formations.

13. The cable hanger of claim 11 wherein said cable carrying formations are vertically adjacent cable carrying formations.

14. The cable hanger of claim 10 wherein said locking hook includes a data carrier wire formation.

15. The cable hanger of claim 14 wherein said data carrier wire formation is a data carrier loop.

16. The cable hanger of claim 10 wherein one of said shoulders has a gripper formation for engaging a messenger wire formed on its distal end.

17. The cable hanger of claim 16 wherein said end of said wire at said spiral gripper extends upwardly.

\* \* \* \* \*